US 9,744,656 B2

(12) United States Patent
Hohmann et al.

(10) Patent No.: US 9,744,656 B2
(45) Date of Patent: Aug. 29, 2017

(54) CLAMPING DEVICE FOR EXPANDING A THREADED BOLT

(71) Applicants: Frank Hohmann, Warstein (DE); Jörg Hohmann, Meschede (DE)

(72) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 346 days.

(21) Appl. No.: 14/568,192

(22) Filed: Dec. 12, 2014

(65) Prior Publication Data

US 2015/0165610 A1   Jun. 18, 2015

(30) Foreign Application Priority Data

Dec. 13, 2013   (DE) .................. 10 2013 113 982

(51) Int. Cl.
*B25B 29/02* (2006.01)
*B23P 19/06* (2006.01)
*F16B 31/04* (2006.01)

(52) U.S. Cl.
CPC ............ *B25B 29/02* (2013.01); *B23P 19/067* (2013.01); *F16B 31/043* (2013.01)

(58) Field of Classification Search
CPC ....... B25B 29/02; B25B 23/14; B25B 21/002; B25B 13/06; B25B 23/145; B23P 19/067; F16B 31/043
See application file for complete search history.

(56) References Cited

U.S. PATENT DOCUMENTS

| | | | | |
|---|---|---|---|---|
| 4,246,810 A | * | 1/1981 | Keske | ..................... B25B 29/02 81/57.38 |
| 4,523,742 A | * | 6/1985 | Reneau | ................... B25B 29/02 254/29 A |
| 2008/0034925 A1 | | 2/2008 | Hohmann et al. | |
| 2010/0175240 A1 | | 7/2010 | Wagner et al. | |
| 2011/0271798 A1 | * | 11/2011 | Wagner | .................. B25B 29/02 81/57.38 |

FOREIGN PATENT DOCUMENTS

| | | |
|---|---|---|
| CN | 202517262 U | 11/2012 |
| DE | 43 00 664 A1 | 7/1994 |
| EP | 0 224 622 A2 | 6/1987 |

* cited by examiner

*Primary Examiner* — Robert Scruggs
(74) *Attorney, Agent, or Firm* — Gudrun E. Huckett

(57) ABSTRACT

A clamping device for expanding a threaded bolt is provided with a support pipe supported against an underlay surrounding the threaded bolt. A cylindrical housing arranged in extension of the support pipe has a piston movable in longitudinal direction and connectable to a hydraulic supply. A changeable bushing is axially carried by the piston and is provided with an inner thread and a radially expanded portion. A resilient arrangement is arranged around the bushing and acts axially on the piston. A lid is secured to the housing. The other support of the resilient arrangement is provided on the lower side of the housing. The lid has a lid base member and a closure lid. The lid base member is provided with an opening closable by the closure lid. The radial extent of the opening is greater than the radial extent of the radially expanded portion of the bushing.

13 Claims, 4 Drawing Sheets

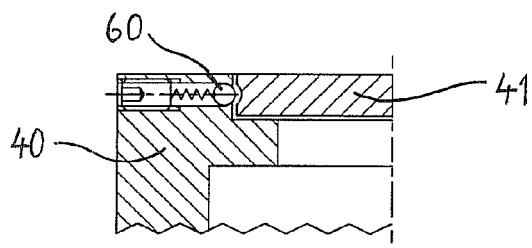
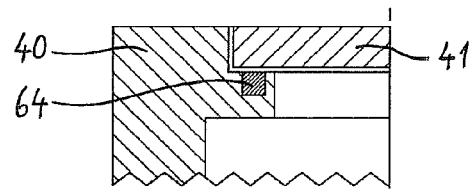
Fig. 4
Fig. 9
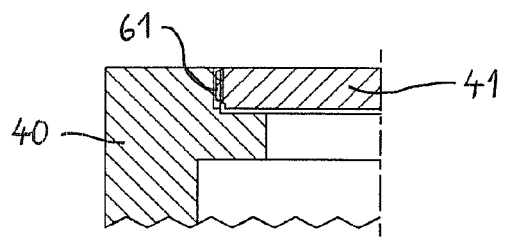
Fig. 5
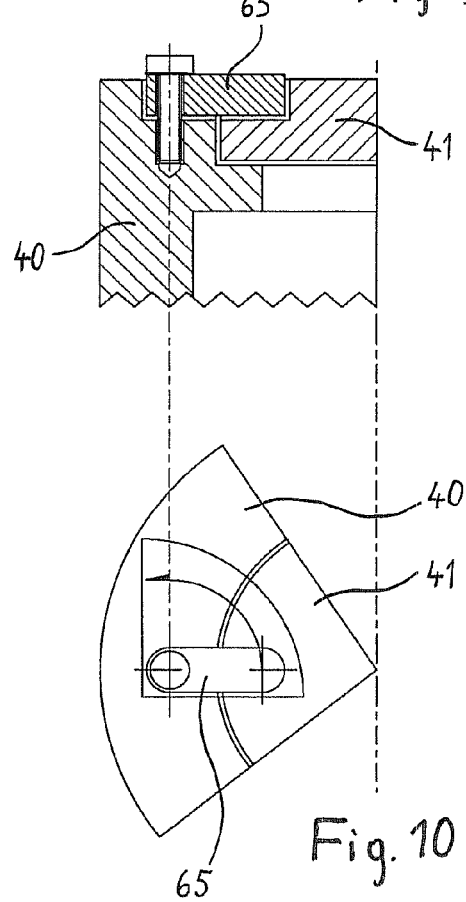
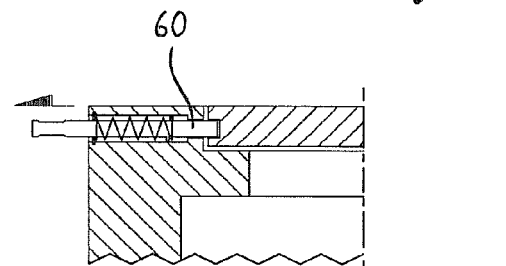
Fig. 6
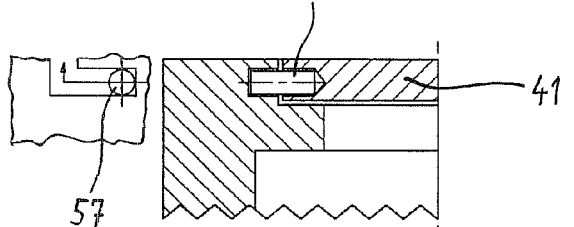
Fig. 7
Fig. 10
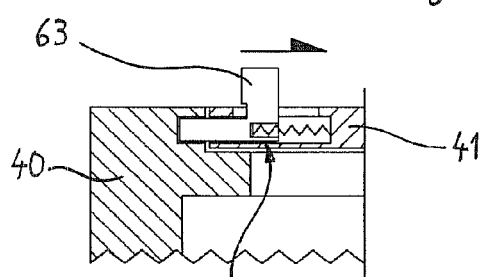
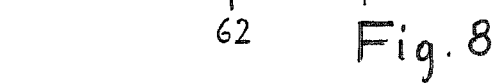
Fig. 8

CLAMPING DEVICE FOR EXPANDING A THREADED BOLT

BACKGROUND OF THE INVENTION

The invention relates to a clamping device for expanding a threaded bolt by pulling on the threaded end portion thereof, comprising a support pipe which is supported as an abutment against an underlay which surrounds the threaded bolt, a cylindrical housing which is arranged in extension of the support pipe and which has at least one piston which can be moved therein in the longitudinal direction and which can be connected to a hydraulic supply line, a changeable bushing which is constructed so as to be able to be axially carried by the piston and which, for screwing to the threaded end portion of the threaded bolt, is provided with an inner thread and, for axial carrying by means of the piston, is provided with a radially expanded portion, a resilient arrangement which is arranged around the changeable bushing and which acts axially on the piston, and a lid which is secured to the cylindrical housing and on the lower side of which the other support of the resilient arrangement is constructed.

A generic clamping device for threaded bolts is known from US 2010/0175240 A1. In order to expand the threaded bolt, there is arranged in the cylindrical housing of the clamping device a changeable bushing which is provided at the lower end thereof with an inner thread for screwing to the threaded bolt. The changeable bushing can be carried axially by means of a piston of the clamping device, which piston is acted on hydraulically, and is provided for this purpose with a radially expanded flange or collar. A resilient arrangement which is arranged around the changeable bushing is supported from above against the changeable bushing or against the piston. A replacement of the changeable bushing is possible but requires inter alia that the resilient arrangement be removed.

Also with a clamping device known from US 2011/0271798 A1, the expansion of the threaded bolt is carried out by means of a changeable bushing which engages in the thread of the threaded bolt. It can be axially carried by means of the piston of the clamping device by the changeable bushing being provided close to the upper end thereof with an outer thread, onto which a carrier ring under which the piston engages can be screwed. A resilient arrangement which is arranged around the changeable bushing is supported on the carrier ring and additionally on the changeable bushing which is provided for this purpose with a step which is inwardly recessed. In order to screw the changeable bushing to the threaded bolt, the clamping device is placed on the screw connection and rotated about the axis thereof whereby the changeable bushing is screwed onto the free threaded portion of the threaded bolt. Such a screwing action with the clamping device being rotated about the axis thereof is time-consuming and in view of the weight of such screw clamping devices is also difficult.

For the clamping devices according to US 2010/0175240 A1 and US 2011/0271798 A1, it is always the case that a replacement of the changeable bushing, for instance for a changeable bushing with a different thread geometry or a different length, is connected with a relatively high level of complexity.

An object of the invention is therefore to provide a clamping device, in which the screwing and unscrewing of the changeable bushing can be carried out in a simple and rapid manner, even with regard to a replacement of the changeable bushing.

SUMMARY OF THE INVENTION

To this end, a generic clamping device is characterised by a two-part construction of the lid from a lid base member and a closure lid, the lid base member being provided with an opening which can be closed by means of the closure lid and whose radial extent is greater than the radial extent of the radially expanded portion of the changeable bushing.

A clamping device constructed in this manner enables in the context of the clamping process rapid screwing and unscrewing of the changeable bushing. A replacement of the changeable bushing, for instance for a changeable bushing with a different thread geometry or length, can be carried out in a simple and rapid manner. The changeable bushing can be taken from the clamping device in an upward direction without great complexity, in particular without having to disassemble the resilient arrangement for this purpose. Owing to the omission of assembly steps which are required for conventional damping devices, screwing operations on highly loaded screw connections can on the whole be carried out in a more simple and rapid manner.

According to an embodiment, the resilient arrangement which may, for example, be disc springs which are arranged so as to be connected in series, is in abutment with a resilient support formed on the piston. In this embodiment, therefore, it is not the changeable bushing which is directly resiliently loaded by the resilient arrangement, but instead the piston. This embodiment also contributes to the fact that, for the insertion and removal of the changeable bushing, the resilient arrangement does not have to be taken into consideration.

The radially expanded portion may either be a radial collar which is directly formed on the changeable bushing or a carrier ring which is screwed to the base member of the changeable bushing and whose lower side then forms the annular axial face with which the changeable bushing is supported axially against the piston so that it is constructed so as to be able to be carried by the piston.

According to another embodiment, the changeable bushing is composed of three longitudinal portions, the first longitudinal portion being provided with the inner thread for screwing onto the threaded bolt, the second longitudinal portion being the radially expanded portion and the third longitudinal portion being constructed in a journal-like manner and filling an opening in the upper side of the clamping device.

An embodiment of the two-part lid is preferred in which the closure lid can be locked by means of rotation in the opening of the lid base member. Suitable locking systems include, for example, a rotational locking, for example, a bayonet connection, between the closure lid and the lid base member.

The closure lid performs inter alia a protection function since, in the event of failure of the changeable bushing, it prevents it from being ejected in an upward direction and being able to harm people in the vicinity.

According to another embodiment, the closure lid is constructed as an annular disc comprising an opening which is coaxial with respect to the opening in the lid base member, the opening in the closure lid being filled by means of a journal-like longitudinal portion of the changeable bushing.

According to another embodiment, the journal-like longitudinal portion of the changeable bushing is provided with an outer end face which in the initial state of the clamping device terminates with the upper side of the clamping device, the journal-like longitudinal portion being provided with a marking below the outer end face. During operation of the clamping device, it is indicated to the operator when the marking first becomes visible that the clamping process and consequently the expansion of the threaded bolt has reached a specific axial dimension.

BRIEF DESCRIPTION OF THE DRAWINGS

Other details and advantages will be appreciated from the following description of the embodiments illustrated in the drawings:

FIG. 4 shows an alternative variant compared with the embodiment according to FIGS. 1 to 3 for securing the closure lid in the lid base member.

FIG. 5 shows an alternative variant compared with the embodiment according to FIGS. 1 to 3 for securing the closure lid in the lid base member.

FIG. 6 shows an alternative variant compared with the embodiment according to FIGS. 1 to 3 for securing the closure lid in the lid base member.

FIG. 7 shows an alternative variant compared with the embodiment according to FIGS. 1 to 3 for securing the closure lid in the lid base member.

FIG. 8 shows an alternative variant compared with the embodiment according to FIGS. 1 to 3 for securing the closure lid in the lid base member.

FIG. 9 shows an alternative variant compared with the embodiment according to FIGS. 1 to 3 for securing the closure lid in the lid base member.

FIG. 10 shows an alternative variant compared with the embodiment according to FIGS. 1 to 3 for securing the closure lid in the lid base member.

DESCRIPTION OF PREFERRED EMBODIMENTS

Figure 1:
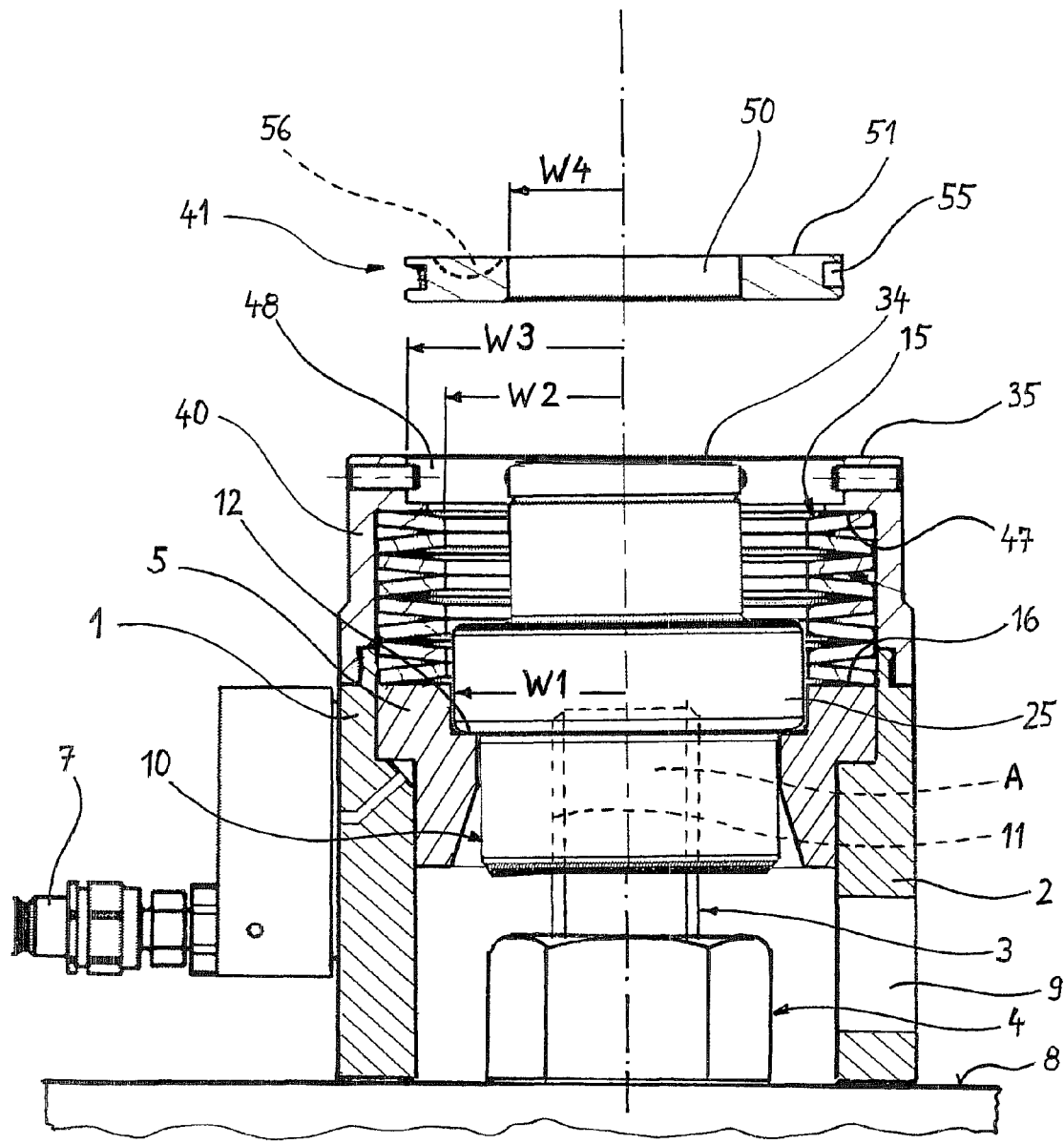
FIG. 1 is a simplified sectioned illustration of a hydraulically functioning threaded bolt clamping device, placed on a threaded bolt and supported on an underlay, a closure lid being illustrated above the clamping device.

The hydraulically operated clamping device serves to tighten and optionally also to release highly loaded screw connections. With the clamping device, it is possible to apply a predetermined pretensioning force to the threaded bolt 3 in the longitudinal direction of the bolt for a specific length of time in order in the meantime to tighten or retighten a nut 4 of the screw connection, which nut is screwed onto the threaded bolt 3.

A changeable bushing 10 which is arranged in the clamping device is provided with an inner thread 11. This inner thread is screwed onto the threaded end portion A of the threaded bolt 3, which portion protrudes beyond the nut 4. Subsequently, the changeable bushing 10 which is screwed in this manner onto the threaded bolt is hydraulically placed under traction, whereby the threaded bolt 3 expands in a longitudinal direction.

The clamping mechanism is surrounded by a cylindrical housing 1. This may also be composed in a modular manner from a plurality of cylindrical portions.

The rigid continuation of the cylindrical housing 1 in a downward direction forms a support pipe 2 which surrounds the nut 4. The support pipe 2 may alternatively also be a component which is separated with respect to the cylindrical housing 1, for example, a component which can be placed thereon.

The support pipe 2 is open at the lower side thereof and is supported on that underlay 8, mostly a machine component on which the nut 4 is also supported. Furthermore, there may be provided a gear mechanism which operates through an opening 9 in the support pipe 2 and by means of which the nut 4 which is screwed onto the threaded bolt 3 can be rotated. This rotation is naturally only possible when the clamping device is operational and the nut 4 is therefore not subjected to considerable friction.

There is located laterally on the cylindrical housing 1 which is constructed in a pressure-resistant manner a hydraulic connection 7, by means of which the hydraulic operating space of the clamping device is connected to an external hydraulic supply with valve control.

The cylindrical housing 1 comprises one or alternatively also a plurality of hydraulic cylinders, which are connected to the external hydraulic supply by means of the hydraulic connection 7 and a flexible, pressure-resistant hydraulic line. In each hydraulic cylinder, a piston 5 which is sealed with respect to the inner cylindrical wall is arranged so as to be able to be moved in the longitudinal direction. In the embodiment described in this instance, only one cylindrical step and consequently only one piston 5 are provided.

By supplying hydraulic pressure to the operating space, the hydraulic piston 5 is raised. This is carried out counter to the pressure force of a resilient arrangement 15 which is supported from above on the piston. The resilient arrangement 15 comprises in this instance annular disc springs which are arranged one on the other and consequently connected in series.

Figure 2:
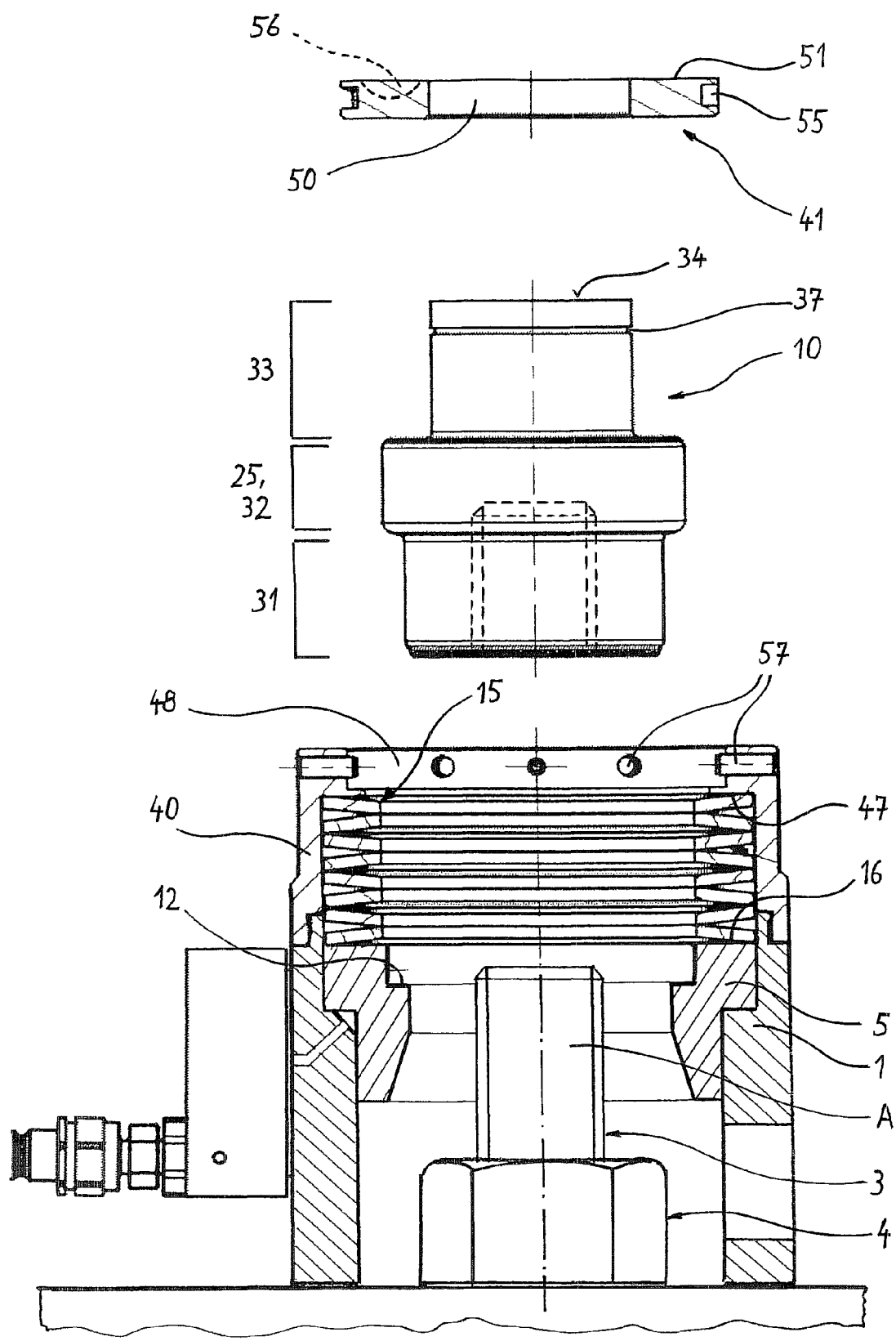
FIG. 2 shows the objects according to FIG. 1 with the changeable bushing removed from the clamping device.

The resilient arrangement 15 presses from above on a resilient support 16 which is formed directly on the piston 5 and acts in this manner on the piston 5 directly with a force which seeks to keep the piston 5 in the basic position which is illustrated in FIG. 1 and FIG. 2 and in which the hydraulic operating space is at a minimum.

The piston 5 is annular and is provided at the inner edge thereof with a preferably continuous step 12. The step 12 forms, facing away from the underlay 8, an axial face on which the changeable bushing 10 is supported by means of an expanded portion 25 which is formed integrally thereon. In this manner, the changeable bushing 10 can be axially carried by the piston 5.

The changeable bushing 10 which is illustrated separately in FIG. 2 is composed, when viewed from the underlay 8, of a first longitudinal portion 31, a second longitudinal portion 32 and a third longitudinal portion 33.

On the first longitudinal portion 31, the changeable bushing 10 has the inner thread 11 which can be subjected to high loads and which can be screwed onto the threaded end portion A of the threaded bolt 3 by means of rotating the changeable bushing. The axial length of the inner thread 11 and consequently the screwing depth available should be at least equal to the thread diameter of the bolt 3, preferably 1.5 times the thread diameter.

The second longitudinal portion 32 of the changeable bushing 10 is in the embodiment according to FIGS. 1 and 2 constructed as an integrally formed collar. This longitudinal portion 32 at the same time forms the largest portion of the changeable bushing in terms of radius. As already described, it serves to axially support the changeable bushing on the piston 5.

The third longitudinal portion 33 is constructed in a journal-like manner and has a smaller diameter than the second longitudinal portion 32 so that, in order to rotate the changeable bushing 10, it can be readily gripped by hand on the third longitudinal portion 33.

The closure of the changeable bushing 10 is formed by a planar outer end face 34. In the embodiment described in this instance, the outer end face 34 in the initial state of the clamping device terminates in a plane with the upper side 35 of the clamping device. In the end face 34, a polygon for motorised rotation of the changeable bushing 10 can be formed centrally. Alternatively, it is possible to extend the longitudinal portion 33 upwards until it clearly protrudes above the upper side 35 and can be gripped by hand at that location in order to rotate the changeable bushing 10. To this end, the longitudinal portion 33 may be provided with a friction-increasing corrugation.

Below the outer end face 34, a marking 37 in the form of a groove is formed in the third longitudinal portion 33. Owing to the position of the marking 37 with respect to the upper side 35 of the clamping device, it is possible for the user to optically identify how far the clamping process has progressed.

In order to be able to completely remove the changeable bushing 10, without previously having to remove a lid base member 40 and the resilient arrangement 15, the changeable bushing 10 has a maximum radial extent W1 which is smaller than the inner extent W2 of the annular disc springs, from which the resilient arrangement 15 is composed. In this instance, the changeable bushing 10 has at the expanded portion 25 or 32 the largest diameter thereof.

The changeable bushing 10 including the three longitudinal portions 31, 32, 33 thereof in the embodiment according to FIGS. 1 and 2 is integral and preferably produced as a rotary component in which only the inner thread 11 additionally has to be produced.

The upper closure of the cylindrical housing 1 is formed by a two-part lid which is composed of the annular lid base member 40 and a closure lid 41. At a lower side of the lid base member 40 facing the piston 5 is the other resilient support 47, that is to say, the resilient support for the end of the resilient arrangement 15 facing away from the piston 5. The lid base member 40 of the two-part lid is securely connected to the cylindrical housing 1, preferably by means of screwing to the cylindrical housing 1.

The lid base member 40 is provided in the centre thereof with a round opening 48 for inserting the closure lid 41. The radial extent W3 of this opening 48 is at least as large as the radial extent W1 of the expanded portion 25 of the changeable bushing 10. Through the opening 48 of the lid base member 40, therefore, it is possible to replace the complete changeable bushing 10, the resilient arrangement 15 remaining in the cylindrical housing.

The closure lid 41 is constructed as an annular disc with an opening 50 of the extent W4, which opening is coaxial with respect to the opening 48 in the lid base member 40. The opening 50 in the closure lid 41 is filled by the journal-like longitudinal portion 33 of the changeable bushing 10. On the whole, therefore, the upper side of the clamping device is composed of the upper side 35 of the lid base member 40, the upper side 51 of the annular closure lid 41 and finally the outer end face 34 of the changeable bushing 10.

Since, according to FIG. 1, the diameter or the radial extent W4 of the opening 50 of the closure lid 41 is smaller than the extent W1 of the radially expanded portion 25 of the changeable bushing 10, when the closure lid 41 is secured, the changeable bushing 10 cannot be ejected upwards out of the clamping device. Such a situation may occur in exceptional cases in the event of failure of the changeable bushing. The securing in the longitudinal direction of the closure lid 41 in the lid base member 40 is therefore an important safety feature.

The closure lid 41 can be locked, for example, by means of rotation in the opening 48 of the lid base member 40. To this end, in the embodiment according to FIGS. 1 and 2, elements of a rotary locking system are formed on the lid base member 40 and on the closure lid 41, in this instance a bayonet locking system. The rotation angle until locking is small and preferably from 15° to 60°. To this end, in the embodiment described here, in the region of the opening 48 there are studs 57 which engage in a locking manner in the manner of a bayonet in grooves 55 which are formed on the periphery of the closure lid 41. In order to close the closure lid 41, it is inserted from above into the opening 48, and then rotated through a rotation angle.

An advantageous aspect for the rotation of the closure lid 41 are finger recesses 56 in the upper side 51 of the closure lid 41.

Further securing of the closure lid 41 is not necessary. The closure lid 41 is also not subjected to loading by the resilient arrangement 15. The latter is supported axially exclusively at the inner side of the lid base member 40 and not against the annular closure lid 41.

Figure 3:
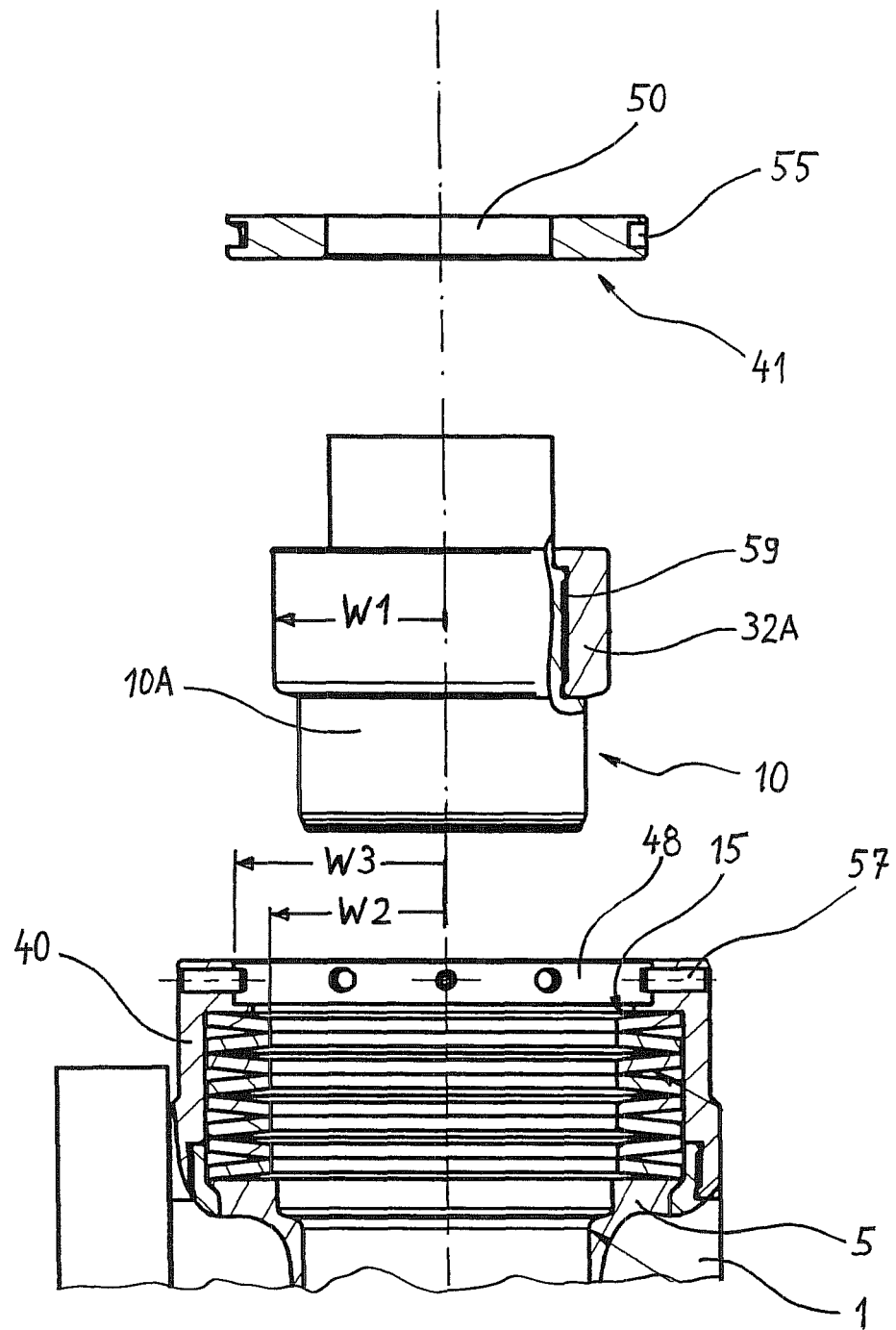
FIG. 3 shows the upper portion of a second embodiment of a hydraulically functioning threaded bolt clamping device, here with the changeable bushing removed.

FIG. 3 shows another embodiment of the clamping device. The single difference with respect to the first embodiment mentioned is that the changeable bushing 10 is constructed in two parts and is composed of a base member 10A and a carrier ring 32A which can be screwed from above on an outer thread 59 of the base member 10A. In this embodiment, the radial extent W3 of the opening 48 of the lid base member 40 and the radial inner extent W2 of the resilient arrangement 15 is also greater than the radial extent W1 of the carrier ring 32A which forms the radially expanded portion.

FIGS. 4-10 show various other variants for releasably securing the closure lid 41 to the lid base member 40.

In FIG. 4 there is located in the lid base member 40 a resiliently loaded securing element 60 which engages in a resilient manner in a corresponding recess on the periphery of the closure lid 41 and thus locks the lid.

In FIG. 5, the closure lid 41 is provided at the periphery thereof with an outer thread which is screwed into a corresponding inner thread of the lid base member 40 so that a screw connection 61 is produced.

In FIG. 6 there is located in the lid base member 40 a securing element 60 in the form of a resiliently loaded bolt. The bolt protrudes outwards with a portion of the length thereof out of the lid base member 40 and can therefore be pulled outwards for unlocking.

In FIG. 7, there acts as a securing element a stud 57 which is located securely in the closure lid 41 and which can be unlocked simply by means of a bayonet which is formed in the edge of the lid base member 40 by means of slight rotation.

In FIG. 8, a resiliently loaded bar 62 is located so as to be radially movable in the closure lid 41. A component of the bar 62 is a button 63 which releases the securing by being pulled radially inwards.

In FIG. 9, the securing of the closure lid 41 with respect to the lid base member 40 is carried out by means of a magnet 64. As illustrated, this may be secured to the lid base member 40 or alternatively to the closure lid 41.

In FIG. 10, finally, the closure lid 41 is locked by means of a bar 65 which is pivotably supported on the lid base member 40. The bar 65 is illustrated in the locking position thereof in each case.

The specification incorporates by reference the entire disclosure of German priority document 10 2013 113 982.5 having a filing date of Dec. 13, 2013, of which the instant application claims priority.

While specific embodiments of the invention have been shown and described in detail to illustrate the inventive principles, it will be understood that the invention may be embodied otherwise without departing from such principles.

LIST OF REFERENCE NUMERALS

1 Cylindrical housing
2 Support pipe
3 Threaded bolt
4 Nut
5 Piston
7 Hydraulic connection
8 Underlay
9 Opening
10 Changeable bushing
10A Base member of the changeable bushing
11 Inner thread
12 Step
15 Resilient arrangement
16 Resilient support
25 Expanded portion
31 Longitudinal portion
32 Longitudinal portion
32A Carrier ring
33 Longitudinal portion
34 Outer end face
35 Upper side
37 Marking
40 Lid base member
41 Closure lid
47 Resilient support
48 Opening
50 Opening
51 Upper side
55 Groove
56 Finger recess
57 Stud
59 Outer thread
60 Securing element
61 Screw connection
62 Bar
63 Button
64 Magnet
65 Bar
A Threaded end portion
W1 Radial extent
W2 Inner extent
W3 Radial extent
W4 Radial extent

What is claimed is:

1. A clamping device for expanding a threaded bolt by pulling on the threaded end portion (A) thereof, the clamping device comprising: a support pipe (2) which is supported as an abutment against an underlay (8) which surrounds the threaded bolt; a cylindrical housing (1) which is arranged in extension of the support pipe (2) and which has at least one piston (5) which can be moved therein in the longitudinal direction and which can be connected to a hydraulic supply line; a changeable bushing (10) which is constructed so as to be able to be axially carried by the piston (5) and which, for screwing to the threaded end portion (A) of the threaded bolt, is provided with an inner thread (11) and, for axial carrying by the piston (5), is provided with a radially expanded portion (25); a resilient arrangement (15) arranged around the changeable bushing (10) and acting axially on the piston (5); and a lid which is secured to the cylindrical housing (1); wherein the lid is of a two-part construction comprising a lid base member (40) and a closure lid (41), wherein the lid base member (40) is securely connected to the cylindrical housing (1) and has a top end with an annular radial collar projecting inwardly and having a radial inner rim defining an opening (48) of the lid base member (40), wherein a lower side of the annular radial collar forms the other support (47) of the resilient arrangement, wherein the closure lid (41) is removably secured in the opening (48) whose radial extent (W3) is greater than the radial extent (W1) of the radially expanded portion (25) of the changeable bushing (10), wherein, when the closure lid (41) is removed, the changeable bushing (10) is removable through the opening (48) from the clamping device and the resilient arrangement (15) remains supported at the annular radial collar.

2. The clamping device according to claim 1, wherein the inner extent (W2) of the resilient arrangement (15) is greater than the radial extent (W1) of the radially expanded portion (25) of the changeable bushing (10).

3. The clamping device according to claim 1, wherein the resilient arrangement (15) is in abutment with a resilient support (16) formed on the piston (5).

4. The clamping device according to claim 1, wherein the radially expanded portion (25) is a radial collar which is integrally formed on the changeable bushing (10).

5. The clamping device according to claim 1, wherein the radially expanded portion (25) is a carrier ring (32A) which is screwed to the base member (10A) of the changeable bushing (10).

6. The clamping device according to claim 1, wherein an annular face is formed at the radially expanded portion (25) and the changeable bushing (10) is axially supported by the annular face on a step (12) of the piston (5).

7. The clamping device according to claim 1, wherein the changeable bushing (10) is composed of: a first longitudinal portion (31) provided with the inner thread (11), a second longitudinal portion (32) being the radially expanded portion (25), and a third longitudinal portion (33) being constructed in a journal-like manner and filling an opening (50) in the upper side of the clamping device.

8. The clamping device according to claim 1, wherein the closure lid (41) is locked by rotation of the lid base member (40) in the opening (48).

9. The clamping device according to claim 1, wherein the closure lid (41) is an annular disc provided with an opening (50) which is coaxial relative to the opening (48) in the lid base member (40) and which is filled by a journal-like longitudinal portion (33) of the changeable bushing (10).

10. The clamping device according to claim 9, wherein the greatest radial extent (W1) of the changeable bushing (10) is greater than the radial extent (W4) of the opening (50) of the closure lid (41).

11. The clamping device according to claim 9, wherein the journal-like longitudinal portion (33) of the changeable bushing is provided with an outer end face (34) which in the initial state of the clamping device terminates with the upper side (35) of the clamping device, and is provided with a marking (37) below the outer end face (34).

12. The clamping device according to claim 1, wherein the lid base member (40) is screwed to the cylindrical housing (1).

13. The clamping device according to claim 1, wherein the closure lid (41) is an annular disc provided with an opening (50) which is coaxial relative to the opening (48) in the lid base member (40), wherein the greatest radial extent (W1) of the changeable bushing (10) is greater than a radial extent (W4) of the opening (50) of the closure lid (41).

* * * * *